(12) United States Patent
Elkins

(10) Patent No.: US 6,690,758 B1
(45) Date of Patent: Feb. 10, 2004

(54) PERFORATED DEBRIS CATCHER FOR A NUCLEAR FUEL ASSEMBLY

(75) Inventor: Robert B. Elkins, Wilmington, NC (US)

(73) Assignee: Global Nuclear Fuel -- Americas, LLC, Wilmington, NC (US)

(*) Notice: Subject to any disclaimer, the term of this patent is extended or adjusted under 35 U.S.C. 154(b) by 0 days.

(21) Appl. No.: 10/463,443

(22) Filed: Jun. 18, 2003

Related U.S. Application Data

(63) Continuation of application No. 09/629,858, filed on Aug. 1, 2000.

(51) Int. Cl.⁷ .............................................. G21C 19/42
(52) U.S. Cl. ................... 376/313; 376/352; 376/434; 376/409
(58) Field of Search ................ 376/434, 352, 376/313, 409

(56) References Cited

U.S. PATENT DOCUMENTS

| | | |
|---|---|---|
| 4,022,661 A | 5/1977 | Smith |
| 4,828,791 A | 5/1989 | DeMario |
| 4,900,507 A | 2/1990 | Shallenberger et al. |
| 5,009,839 A | 4/1991 | King |
| 5,024,806 A | 6/1991 | Cioffi et al. |
| 5,030,412 A | 7/1991 | Yates et al. |
| 5,219,517 A | 6/1993 | Nylund |
| 5,345,483 A | 9/1994 | Johansson et al. |
| 5,361,287 A | 11/1994 | Williamson |
| 5,384,814 A | 1/1995 | Matzner |
| 5,390,220 A | 2/1995 | Zuloaga |
| 5,406,604 A | 4/1995 | Ledford et al. |
| 5,420,901 A | 5/1995 | Johansson |
| 5,488,634 A | 1/1996 | Johansson et al. |
| 5,519,745 A | 5/1996 | Proebstle |
| 5,748,694 A | 5/1998 | King |

FOREIGN PATENT DOCUMENTS

| | | | |
|---|---|---|---|
| DE | 90 07 771 | 10/1995 | |
| EP | 709 856 | 5/1996 | .................. 376/313 |
| JP | 238237 | 10/1985 | .................. 376/313 |
| JP | 9-223549 | 8/1997 | .................. 376/313 |
| JP | 2000-284080 | 10/2000 | .................. 376/313 |
| SE | 0 432 738 A1 | 12/1990 | .................. 376/313 |

Primary Examiner—Michael J. Carone
Assistant Examiner—R Palabrica
(74) Attorney, Agent, or Firm—Nixon & Vanderhye

(57) ABSTRACT

A nuclear fuel assembly includes a fuel bundle resting on a lower tie plate. The lower tie plate includes a grid having raised bosses disposed in a rectilinear array for receiving the end plugs of the fuel rods and webs interconnecting the bosses. Between the raised bosses and the end plugs, there is disposed a filter plate having holes registering with the holes through the bosses for receiving the end plugs and apertures providing an approximate 40% open area through the filter plate. The webs of the tie plate grid are recessed from the upper edges of the bosses, facilitating flow through the apertures of the filter plate.

23 Claims, 5 Drawing Sheets

PERFORATED DEBRIS CATCHER FOR A NUCLEAR FUEL ASSEMBLY

This application is a continuation of application Ser. No. 09/629,858, filed Aug. 1, 2000, now pending, the entire content of which is hereby incorporated by reference in this application.

BACKGROUND OF THE INVENTION

The present invention relates to a nuclear fuel assembly including a fuel bundle and a lower tie plate for supporting the fuel bundle and particularly relates to a filter plate resting on a lower tie plate grid for screening debris from the flow of coolant into the fuel bundle.

In a nuclear reactor, liquid coolant/moderator flows into the reactor core from the bottom and exits the core as a water/steam mixture from the top. The core includes a plurality of fuel bundles arranged in vertical side-by-side relation, each containing a plurality of fuel rods. The fuel bundles are each supported on a lower tie plate. The tie plate typically includes an upper grid, a lower inlet nozzle and a transition region between the inlet nozzle and the grid whereby coolant water entering the inlet nozzle flows through the transition region and through the grid generally upwardly and about the individual fuel rods of the fuel bundle supported by the lower tie plate.

Over time, debris accumulates in the reactor and can result in fuel bundle failures in the field by debris fretting through the fuel rod cladding. Such debris can include, for example, extraneous materials left over from reactor construction and various other materials employed during outages and repairs. It will be appreciated that the coolant moderator circulation system in a nuclear reactor is closed and that the debris accumulates over time with increasing age and use of the reactor. Many and various types of debris filters or catchers have been proposed and used in the past. One such system employs a series of curved plates extending substantially parallel to the direction of coolant flow interspersed with the webs and bosses of the lower tie plate grid to filter debris. While certain advantages accrue to this type of debris catcher, the various parts are difficult to manufacture and require complex assembly. Another type of debris filter uses a stacked wire concept perpendicular to the coolant flow. While this is effective in filtering out debris, the wires of the debris filter themselves have been known to generate debris, resulting in fuel bundle failures.

In current BWR debris filters of the assignee hereof, the debris filter is cast integrally with the lower tie plate. The hole size and small ligament web between the holes, however, are very near the investment casting manufacturability limits and oftentimes require hand rework to produce the filter. Particularly, an integral cast plate containing multiple holes extending parallel to the direction of coolant flow at the bottom of the boss/web structure of the lower tie plate grid supporting the fuel rods has been employed as a debris filter. While this design is simple and robust and does not add additional piece parts to the lower tie plate, any reduction in size of the debris filtering holes would render the lower tie plate very difficult to cast. It is therefore desirable to improve the effectiveness of a debris filter, while simultaneously improving its manufacturability and assembly, reduce its costs and provide a filter without substantially increasing the pressure drop and preferably decreasing the pressure drop to enable flexibility in the overall fine-tuning of the bundle thermal hydraulic design.

BRIEF SUMMARY OF THE INVENTION

In accordance with a preferred embodiment of the present invention, there is provided a filter plate for overlying a cast lower tie plate having a grid formed of spaced bosses having holes and webs interconnecting the bosses defining with the bosses flow openings through the grid. The filter plate includes holes spaced one from the other for registration with the holes through the bosses when the filter plate overlies the grid. The filter plate also has a plurality of reduced apertures, e.g., reduced diameter apertures, spaced from one another and the holes through the filter plate. The apertures are significantly smaller in size and area than the holes. Additionally, the upper edges of the webs interconnecting the bosses are spaced below the upper edges of the bosses such that the filter plate rests only on the upper edges of the bosses and not along the upper edges of the webs. This frees additional apertures through the filter plate for flow of coolant therethrough.

To secure the filter plate in position on the lower tie plate grid, the fuel rods have either smooth-sided or threaded end plugs. The fuel rods having threaded end plugs constitute tie rods or part-length fuel rods. Those threaded end plugs extend through the filter plate holes and are threaded into corresponding female threaded holes of the bosses to secure the fuel bundle to the lower tie plate. However, the threaded end plugs do not engage the margins of the holes through the filter plate and do not assist in securing the filter plate to the tie plate. The smooth-sided end plugs of the remaining fuel rods extend through the registering holes of the filter plate and bosses and margins of the filter plate holes are engaged by those end plugs to maintain the filter plate positioned on the lower tie plate grid. The weight of the fuel rods with the smooth-sided end plugs hold down and position the filter plate against the lower tie plate.

The coolant flows through the lower tie plate and into the flow openings between the bosses and the webs. The flow continues through the apertures of the filter plate for flow about the fuel rods of the fuel bundle. The small size of the apertures through the filter plate serves to catch the debris in the coolant/moderator closed-circuit circulation system.

In a preferred embodiment according to the present invention, there is provided a nuclear fuel assembly comprising a fuel bundle having a plurality of fuel rods, a fuel rod support structure including a lower tie plate having an inlet nozzle, a lower tie plate grid and a transition structure for receiving coolant entering the nozzle and flowing coolant through the transition structure to the lower tie plate grid, the lower tie plate grid including a plurality of spaced bosses defining holes sized for receiving lower ends of the fuel rods within the holes of the bosses, the lower tie plate grid further including webs interconnecting the bosses to define with the bosses a plurality of flow openings through the lower tie plate grid for flowing coolant through the tie plate grid, a filter plate disposed on the upper edges of the bosses and having a plurality of spaced holes therethrough in registration with the holes in the bosses, the filter plate having a plurality of apertures therethrough spaced from the filter plate holes and in registration with the flow openings between the bosses and the webs, the area of each aperture being smaller than the area of each hole through the filter plate and the number of apertures being in excess of the number of the holes through the filter plate and a predetermined number of the fuel rods having end plugs received in the registering holes of the filter plate and the bosses and engaging the filter plate about the margins of the holes therethrough to position and maintain the filter plate against the ends of the bosses of the lower tie plate grid.

In a further preferred embodiment according to the present invention, there is provided a nuclear fuel assembly comprising a fuel bundle having a plurality of fuel rods, a fuel rod support structure including a lower tie plate having an inlet nozzle, a lower tie plate grid and a transition structure for receiving coolant entering the nozzle and flowing coolant through the transition structure to the lower tie plate grid, the lower tie plate grid including a plurality of spaced bosses defining holes sized for receiving lower ends of the fuel rods within the holes of the bosses, the lower tie plate grid further including webs interconnecting the bosses to define with the bosses a plurality of flow openings through the lower tie plate grid for flowing coolant through the tie plate grid, the webs having upper edges recessed below upper edges of the bosses, a filter plate disposed on the upper edges of the bosses and having a plurality of spaced holes therethrough in registration with the holes in the bosses, the filter plate having a plurality of apertures therethrough in registration with the flow openings between the bosses and the webs, the cross-sectional area of each filter plate hole being at least fifteen times the cross-sectional area of each aperture through the filter plate and the number of apertures being in excess of ten for each hole through the filter plate and a predetermined number of the fuel rods having end plugs received in the registering holes of the filter plate and the bosses.

DETAILED DESCRIPTION OF THE INVENTION

Figure 1:
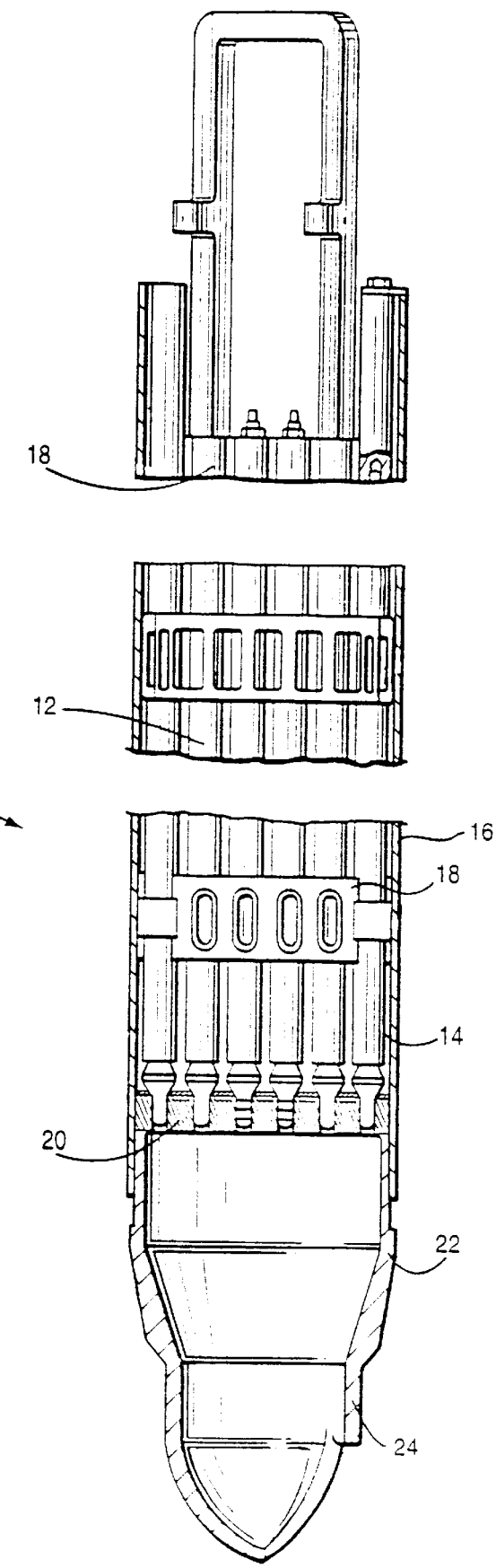
FIG. 1 is a cross-sectional view with parts broken out for ease of illustration of a fuel bundle and support structure thereof according to the prior art.

Referring now to the drawing figures, particularly to FIG. 1, there is illustrated a representative example of a fuel assembly, generally designated 10. Fuel assembly 10 includes a plurality of nuclear fuel rods 12 forming a nuclear fuel bundle 14 disposed with a fuel channel 16. The rods 12 are connected at their upper ends to an upper tie plate 18 and are supported at their lower ends in a lower tie plate grid 20 forming part of a lower tie plate 22. Spacers 18 are arranged at a plurality of vertically spaced locations along the fuel bundle to maintain lateral spacing of the fuel rods 12 relative to one another. The lower tie plate includes an inlet nozzle 24 for receiving coolant water for transmission through the lower tie plate 22, the tie plate grid 20 and upwardly therefrom for flow about the fuel rods for generating steam.

Figure 2:
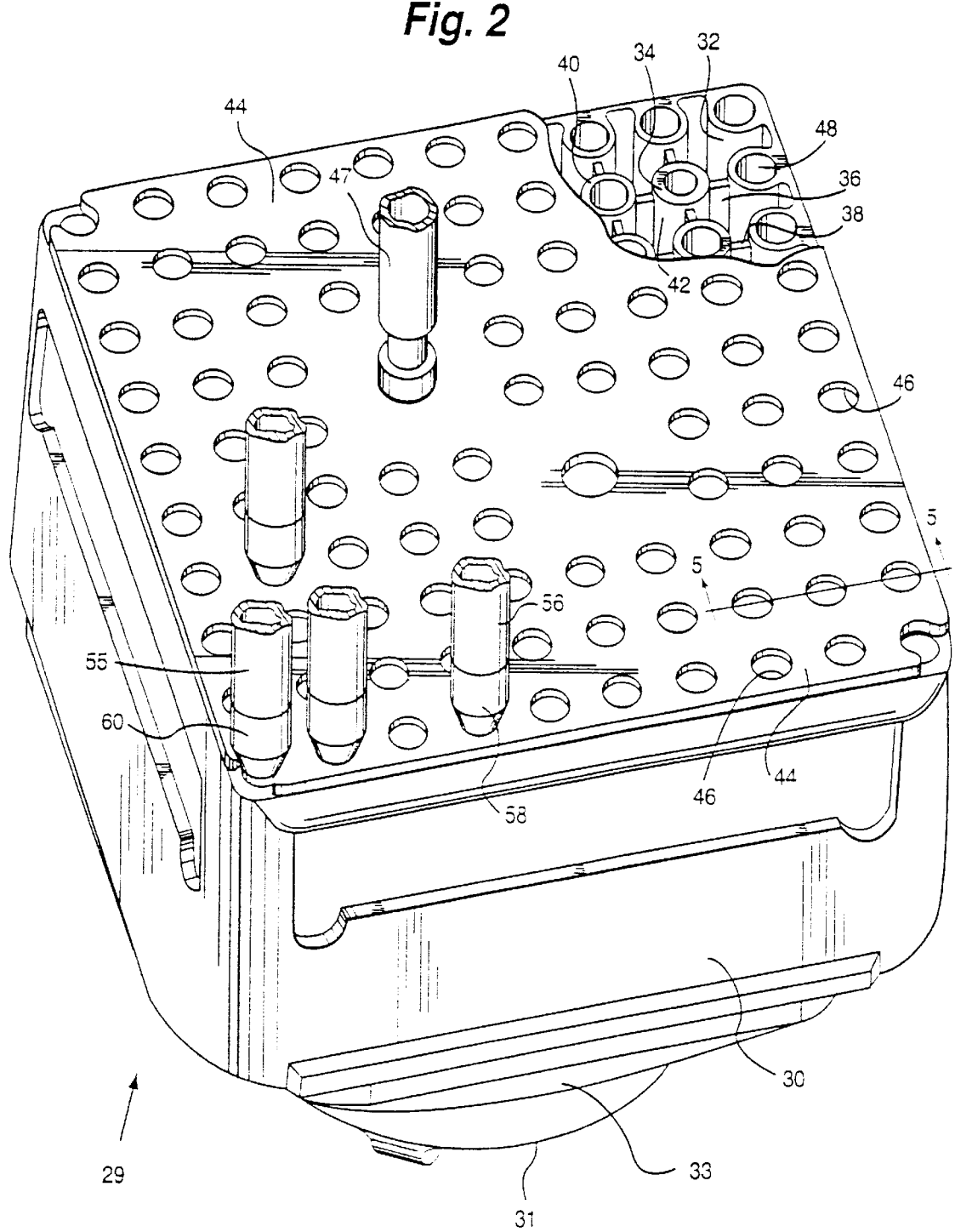
FIG. 2 is a perspective view of a support structure for a fuel bundle according to the preferred embodiment of the present invention.
Figure 3:
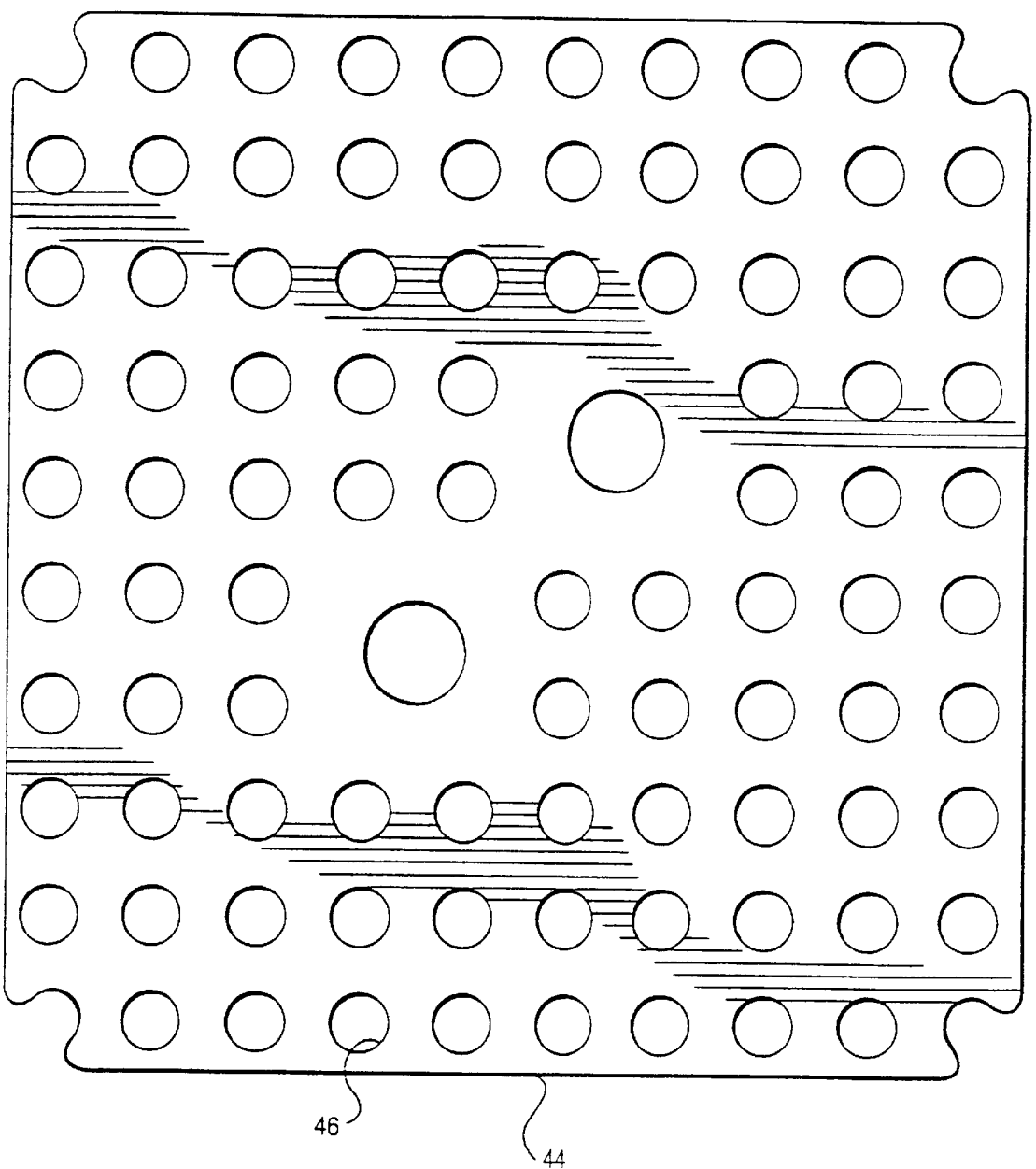
FIG. 3 is a plan view of a filter plate overlying the lower tie plate grid of the support structure.

Referring now to FIG. 2, there is illustrated a fuel rod support structure 29 comprised of a lower tie plate 30 constructed in accordance with a preferred embodiment of the present invention. The lower tie plate 30 includes a nozzle 31 adjacent its lower end for receiving water for flow upwardly through a transition structure 33 and through a tie plate grid 32 and for flow about the fuel rods 12. The tie plate grid 32 as illustrated in FIG. 2 lies adjacent the upper end of the tie plate 30 and is comprised of an array of cylindrical bosses 34 which extend between upper and lower surfaces of the tie plate grid 32 for receiving the cylindrical end plugs of the nuclear fuel rods for supporting the latter, as described hereinafter. The bosses 34 are arranged in a rectilinear array, a 10×10 array being illustrated. The centerlines of the bosses 34 are arranged at corners of substantially square matrices thereof. Interconnecting and forming the sides of the square matrices are webs 36 joining the adjacent cylindrical bosses 34. As will be appreciated from a review of FIG. 2, the upper edges 38 of the webs are recessed below the upper cylindrical edges 40 of the bosses. With this configuration, it will be seen that the webs 36 have portions formed along the sides of each square matrix and, together with convex outer portions of the cylindrical bosses 34, define coolant flow openings 42. Thus, coolant flow openings 42 extend between the upper and lower surfaces of the grid for flowing coolant from the inlet nozzle of the lower tie plate through the grid and upwardly about the fuel rods supported on the lower tie plate 30.

The debris-catching function is performed by a filter plate 44 carried by the lower tie plate 30. As illustrated in FIG. 2, the filter plate 44 includes a plurality of holes 46 arranged in an identical array relative to the holes 48 of the bosses 34. Consequently, when the filter plate 44 overlies the lower tie plate grid, the holes 46 register with holes 48 through bosses 34, affording a combined opening for receiving the lower end plugs of the fuel rods. Also, registering holes are provided in the filter plate and the grid to receive end plugs of water rods 47.

Figure 4:
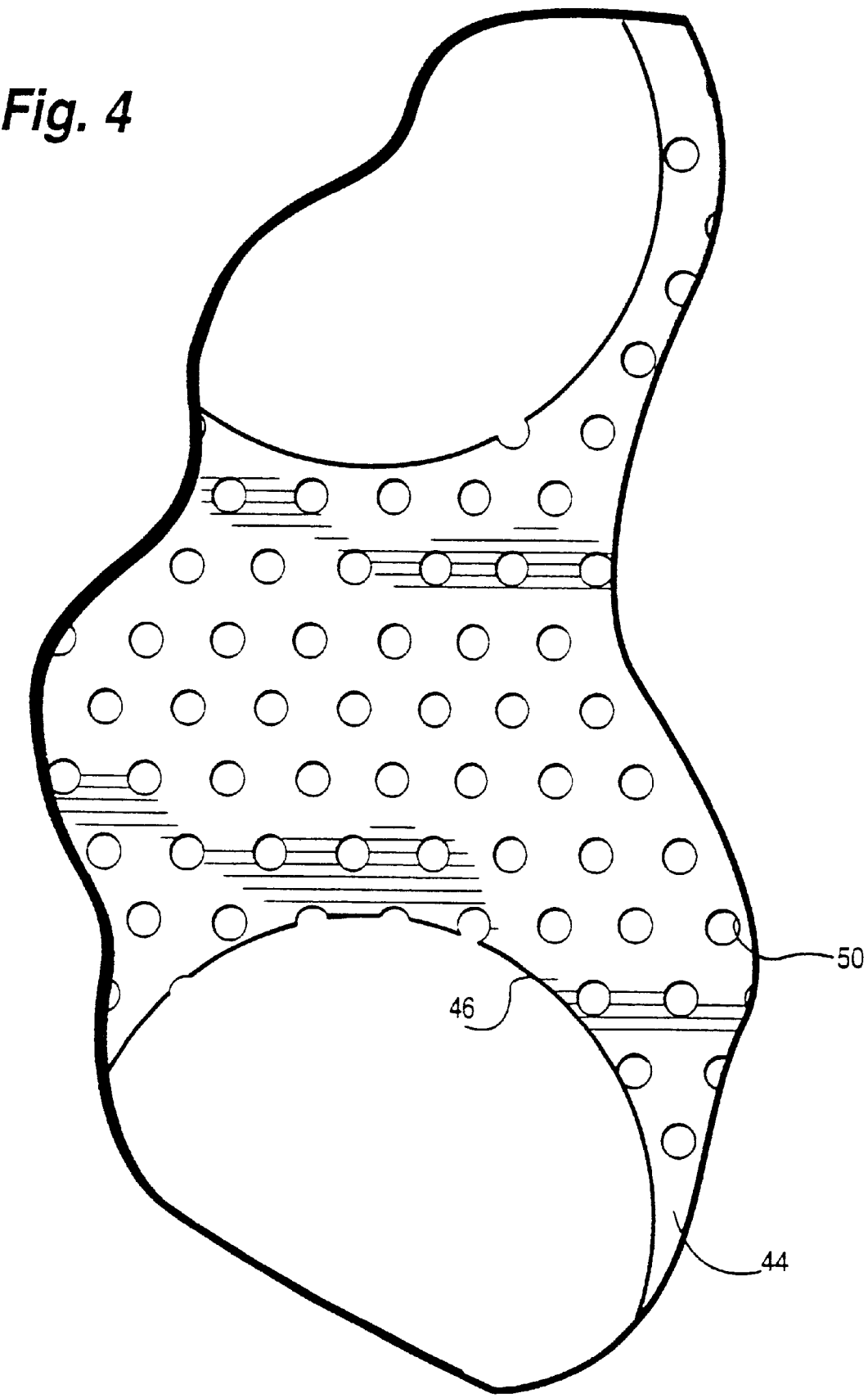
FIG. 4 is an enlarged fragmentary view of the filter plate.

Referring now to FIG. 4, there is illustrated an enlarged view of the filter plate 44. As illustrated the filter plate 44 includes a plurality of apertures 50 between the holes 46. In a preferred embodiment of the present invention, the filter plate comprises a stainless steel plate having a thickness of 0.048 inches with staggered apertures 50 having diameters of 0.0625 inches on 0.094-inch centers. The number of apertures 50 through the filter plate is in excess of ten and preferably in excess of fifteen for each hole 46 through said filter plate 44. The cross-sectional area of each hole 46 is at least fifteen times and preferably twenty times the cross-sectional area of each aperture 50. As illustrated, each aperture 50 has six surrounding apertures in a hexagonal array of apertures. To provide perspective, the filter plate is preferably about 5.070 inches on a side, having holes 46 of 0.0287 inches diameter. The apertures 50 provide about at least 30% open area through the plate, with approximately 132 holes per square inch. The diameters of the holes 46 through plate 44 correspond to the inner diameters of the bosses 34 such that, upon application of the filter plate 44 in overlying relation to the tie plate grid, the plate 44 is wholly supported by the edges 40 of the bosses. Consequently, the flow openings 42 between the bosses and webs lie in direct alignment with the apertures 50. Additionally, because the upper edges of the webs are recessed below the upper edges of the bosses and hence the underside of the filter plate 44, the flow area through the filter plate includes each aperture 50 except those overlying the edges 40 of the bosses. The edges 38 of the webs 36 do not block the vertically registering apertures.

Figure 5:
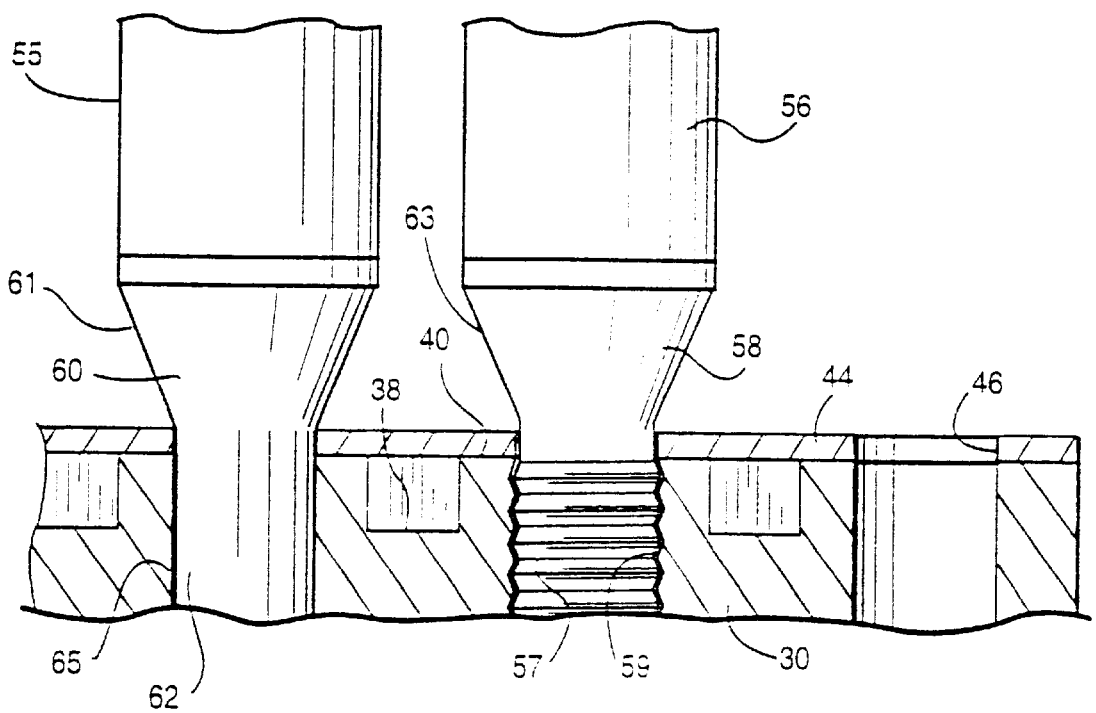
FIG. 5 is an enlarged fragmentary cross-sectional view illustrating the end plugs of a tie rod and a fuel rod disposed in the registering openings of the filter plate and lower tie plate grid.

It will be appreciated that the fuel rods of the fuel bundle are of different types. For example, certain of the fuel rods comprise tie rods for securing the fuel bundle to the lower tie plate. Those fuel rods comprising tie rods have end plugs at their lower ends which are threaded for threaded engagement with complementary female threads within associated bosses. Thus, as illustrated in FIG. 5, end plugs 58 of tie rods 56 have threaded male projections 57 for threaded engagement with the complementary female threads 59 of the bosses in which the end plugs reside. Additionally, part-length fuel rods, where applicable also have threaded end plugs. Consequently, a certain number of additional selected holes through the bosses are complementary threaded for receiving the threaded end plugs. The remaining holes 48 in the bosses 34 have smooth sides. Thus, the remaining fuel rods 55 have end plugs 60 having end projections 62 with smooth side surfaces for slidable reception within correspondingly smooth-sided bores.

It will be appreciated that the end plugs 58, 60 pass through the registering holes 46 of the filter plate for reception in the holes of the bosses. For those fuel rods having smooth-sided end plugs 60, the end plugs are received through the registering holes 46 and 48 of the plate and grid, respectively, with the tapered side surfaces 61 of the end plugs bearing against the margins of the holes through the filter plate 44. This engagement and the weight of the fuel rods holds the filter plate 44 down on and against the upper edges 40 of the bosses 34 of the lower tie plate grid. The tapered surfaces 63 of the end plugs 58 having the threaded male extensions 57, however, are spaced from the margins of the holes 46 through the filter plate 44. That is, there is a discrete gap between the end plugs and the margins defining the holes through the filter plates which receive the threaded end plugs. This affords a tolerance for securing the threaded end plugs in the female threaded bosses.

Consequently, there is provided a debris-catching filter plate with substantial reduction in hole size as compared with debris catchers of the prior art for minimizing or eliminating failure of the fuel bundles resulting from debris collection. Moreover, the assembly of the present invention is readily manufacturable and assembled with the tie plate without requiring additional parts. The prior art debris catcher integrally cast with the tie plate is thus eliminated, together with its associated problems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear fuel assembly comprising:
    a fuel bundle having a plurality of fuel rods;
    a fuel rod support structure including a lower tie plate having an inlet nozzle, a lower tie plate grid and a transition structure for receiving coolant entering said nozzle and flowing coolant through said transition structure to said lower tie plate grid;
    said lower tie plate grid including a plurality of spaced bosses defining holes sized for receiving lower ends of said fuel rods within the holes of said bosses;
    said lower tie plate grid further including webs interconnecting said bosses to define with said bosses a plurality of flow openings through the lower tie plate grid for flowing coolant through said tie plate grid, said webs having upper edges recessed below upper edges of said bosses;
    a flat filter plate extending in a plane overlying the lower tie plate grid and disposed on upper edges of said bosses and spaced from said upper edges of said webs to define spaces therebetween, said flat filter plate having a plurality of spaced holes therethrough in registration with the holes in said bosses and bounded by a peripheral margin generally corresponding to a peripheral margin of the lower tie plate grid, said filter plate having a plurality of apertures therethrough spaced from said filter plate holes and in registration with the flow openings between said bosses and said webs and with the spaces between said filter plate and the upper edges of said webs for flowing coolant therethrough, the area of each said aperture being smaller than the area of each said hole through said filter plate and the ratio of the total number of apertures to the total number of said holes through said filter plate being in excess of ten; and
    a predetermined number of said fuel rods having end plugs received in said registering holes of said filter plate and said bosses and engaging said filter plate about the margins of said holes therethrough to position and maintain the filter plate against the ends of the bosses of the lower tie plate grid.

2. An assembly according to claim 1 wherein the ratio of the total number of apertures to the total number of said holes through said filter plate is in excess of fifteen.

3. An assembly according to claim 1 wherein the cross-sectional area of each said hole through said filter plate is at least fifteen times the cross-sectional area of each said aperture.

4. An assembly according to claim 1 wherein the cross-sectional area of each said hole through said filter plate is at least twenty times the cross-sectional area of each said aperture.

5. An assembly according to claim 1 wherein said end plugs of said predetermined number of fuel rods are smooth-sided and rest in registering holes holding down the debris filter plate.

6. An assembly according to claim 1 wherein said plurality of fuel rods includes tie rods having threaded end plugs for threaded engagement in threaded registering holes of said bosses to secure said fuel bundle to said lower tie plate, said threaded end plugs being spaced from margins of the holes about said filter plate in final securement thereof to said lower tie plate.

7. An assembly according to claim 1 wherein said filter plate apertures form an open area through said filter plate of approximately at least 30% of the area of said filter plate.

8. An assembly according to claim 1 wherein the ratio of the total number of apertures to the total number of said holes through said filter plate is in excess of fifteen, the cross-sectional area of each said hole through said filter plate being at least fifteen times the cross-sectional area of each said aperture.

9. An assembly according to claim 1 wherein said end plugs of said predetermined number of fuel rods are smooth-sided and rest in registering holes holding down the filter plate, said plurality of fuel rods including tie rods having threaded end plugs for threaded engagement in threaded registering holes of said bosses to secure said fuel bundle to said lower tie plate, said threaded end plugs being spaced from margins of the holes about said filter plate in final securement thereof to said lower tie plate.

10. An assembly according to claim 9 wherein the cross-sectional area of each said hole through said filter plate is at least fifteen times the cross-sectional area of each said aperture.

11. An assembly according to claim 9 wherein said filter plate apertures form an open area through said filter plate of approximately at least 30% of the area of said filter plate.

12. An assembly according to claim 9 wherein the ratio of the total number of apertures to the total number of said holes through said filter plate is in excess of fifteen, the cross-sectional area of each said hole through said filter plate being at least fifteen times the cross-sectional area of each said aperture.

13. A nuclear fuel assembly comprising:
a fuel bundle having a plurality of fuel rods;
a fuel rod support structure including a lower tie plate having an inlet nozzle, a lower tie plate grid and a transition structure for receiving coolant entering said nozzle and flowing coolant through said transition structure to said lower tie plate grid;
said lower tie plate grid including a plurality of spaced bosses defining holes sized for receiving lower ends of said fuel rods within the holes of said bosses;
said lower tie plate grid further including webs interconnecting said bosses to define with said bosses a plurality of flow openings through the lower tie plate grid for flowing coolant through said tie plate grid, said webs having upper edges recessed below upper edges of said bosses;
a flat filter plate extending in a plane and disposed on upper edges of said bosses and spaced from said upper edges of said webs to define spaces therebetween, said flat filter plate having a plurality of spaced holes therethrough in registration with the holes in said bosses and bounded by a peripheral margin generally corresponding to a peripheral margin of the lower tie plate grid, said filter plate having a plurality of apertures therethrough in registration with the flow openings between said bosses and said webs and with the spaces between said filter plate and the upper edges of said webs for flowing coolant therethrough, the cross-sectional area of each said filter plate hole being at least fifteen times the cross-sectional area of each said aperture through said filter plate and the ratio of the total number of apertures to the total number of said holes through said filter plate being in excess of ten; and
a predetermined number of said fuel rods having end plugs received in said registering holes of said filter plate and said bosses.

14. An assembly according to claim 13 wherein the cross-sectional area of each said hole through said filter plate is at least fifteen times the cross-sectional area of each said aperture.

15. An assembly according to claim 13 wherein said filter plate apertures form an open area through said filter plate of approximately at least 30% of the area of said filter plate.

16. An assembly according to claim 13 wherein the ratio of the total number of apertures to the total number of said holes through said filter plate is in excess of fifteen.

17. An assembly according to claim 13 wherein said end plugs of said predetermined number of fuel rods are smooth-sided and rest in registering holes holding down the filter plate.

18. An assembly according to claim 13 wherein said plurality of fuel rods includes tie rods having threaded end plugs for threaded engagement in threaded registering holes of said bosses to secure said fuel bundle to said lower tie plate, said threaded end plugs being spaced from margins of the holes about said filter plate in final securement thereof to said lower tie plate.

19. An assembly according to claim 13 wherein said filter plate apertures form an open area through said filter plate of approximately at least 30% of the area of said filter plate.

20. An assembly according to claim 3 wherein said end plugs of said predetermined number of fuel rods are smooth-sided and rest in registering holes, said plurality of fuel rods including tie rods having threaded end plugs for threaded engagement in threaded registering holes of said bosses to secure said fuel bundle to said lower tie plate, said threaded end plugs being spaced from margins of the holes about said filter plate in final securement thereof to said lower tie plate.

21. An assembly according to claim 20 wherein the cross-sectional area of each said hole through said filter plate is at least fifteen times the cross-sectional area of each said aperture.

22. An assembly according to claim 20 wherein said filter plate apertures form an open area through said filter plate of approximately at least 30% of the area of said filter plate.

23. An assembly according to claim 20 wherein the ratio of the total number of apertures to the total number of said holes through said filter plate is in excess of fifteen.

\* \* \* \* \*

UNITED STATES PATENT AND TRADEMARK OFFICE
CERTIFICATE OF CORRECTION

PATENT NO.    : 6,690,758 B1                                                Page 1 of 1
DATED         : February 10, 2004
INVENTOR(S)   : Elkins It is certified that error appears in the above-identified patent and that said Letters Patent is hereby corrected as shown below:

<u>Column 8,</u>
Line 23, delete "claim 3" and insert -- claim 13 --

Signed and Sealed this

Twenty-fifth Day of May, 2004

JON W. DUDAS
*Acting Director of the United States Patent and Trademark Office*